US012579982B2

(12) United States Patent
Min et al.

(10) Patent No.: US 12,579,982 B2
(45) Date of Patent: **\*Mar. 17, 2026**

(54) METHODS, SYSTEMS AND APPARATUSES FOR IMPROVED SPEECH RECOGNITION AND TRANSCRIPTION

(71) Applicant: Comcast Cable Communications, LLC, Philadelphia, PA (US)

(72) Inventors: Rui Min, Vienna, VA (US); Stefan Deichmann, Alexandria, VA (US); Hongcheng Wang, Arlington, VA (US); Geifei Yang, Washington, DC (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 160 days.

This patent is subject to a terminal disclaimer.

(21) Appl. No.: 18/521,683

(22) Filed: Nov. 28, 2023

(65) Prior Publication Data

US 2024/0096327 A1 Mar. 21, 2024

Related U.S. Application Data

(63) Continuation of application No. 18/068,613, filed on Dec. 20, 2022, which is a continuation of application
(Continued)

(51) Int. Cl.
*G10L 15/22* (2006.01)
*G10L 15/08* (2006.01)

(52) U.S. Cl.
CPC ............ *G10L 15/222* (2013.01); *G10L 15/08* (2013.01); *G10L 2015/088* (2013.01)

(58) Field of Classification Search
CPC ... G10L 15/22; G10L 2015/088; G10L 15/08; G10L 2015/223; G10L 15/32; G10L 15/063; G10L 15/26; G10L 15/01; G10L 15/1822; G10L 15/30; G10L 15/1815; G10L 15/005; G10L 15/14; G10L 2015/228; G10L 13/00; G10L 15/02; G10L 15/222; G10L 25/78; G10L 15/04; G10L 15/183; G10L 17/22; G10L 15/197; G10L 15/285; G10L 13/02; G10L 15/16; G10L 15/10; G10L 15/187; G10L 2015/0631; G10L 2015/081; G10L 15/06;
(Continued)

(56) References Cited

U.S. PATENT DOCUMENTS 6,377,921 B1 * 4/2002 Bahl ..................... G10L 15/063
704/243
7,483,833 B2 1/2009 Peters
(Continued)

FOREIGN PATENT DOCUMENTS

WO WO-2017135148 A1 8/2017
WO WO-2020013428 A1 1/2020

*Primary Examiner* — Abdelali Serrou
(74) *Attorney, Agent, or Firm* — Ballard Spahr LLP

(57) ABSTRACT

Methods, systems, and apparatuses for improved speech recognition and transcription of user utterances are described herein. A user utterance may be processed by a speech recognition computing device. One or more acoustic features associated with the user utterance may be used to determine whether one or more actions are to be performed based on a transcription of the user utterance.

20 Claims, 12 Drawing Sheets

Related U.S. Application Data

No. 17/141,926, filed on Jan. 5, 2021, now Pat. No. 11,551,694.

(58) Field of Classification Search
CPC . G10L 15/18; G10L 15/19; G10L 2015/0638; G10L 2015/226; G10L 15/00; G10L 15/083; G10L 15/144; G10L 15/20; G10L 15/25; G10L 17/02; G10L 17/04; G10L 17/14; G10L 17/24; G10L 17/26; G10L 2015/0635; G10L 2015/221; G10L 2015/225; G10L 2015/227; G10L 25/57; G10L 25/93; G06F 3/167; G06F 40/30; G06F 3/16; G06F 40/166; G06F 40/279; G06F 16/3329; G06F 16/35; G06F 3/0484; G06F 9/453; G06F 3/048; G06F 40/16; G06F 40/205; G06F 40/242; G06F 40/253; G06F 40/268; G06F 40/295
See application file for complete search history.

(56) References Cited

U.S. PATENT DOCUMENTS

| | | | | |
|---|---|---|---|---|
| 9,607,102 | B2 | 3/2017 | Lavallee | |
| 9,761,226 | B2 | 9/2017 | Michaelangelo | |
| 10,242,664 | B2 | 3/2019 | Paxinos | |
| 10,380,997 | B1 | 8/2019 | Ward | |
| 10,388,272 | B1 | 8/2019 | Thomson | |
| 10,573,312 | B1 | 2/2020 | Thomson | |
| 11,003,839 | B1 | 5/2021 | Hatch | |
| 11,017,778 | B1 * | 5/2021 | Thomson | G10L 15/26 |
| 11,170,761 | B2 | 11/2021 | Thomson | |
| 11,302,346 | B2 | 4/2022 | Perri | |
| 11,551,694 | B2 | 1/2023 | Min | |
| 2010/0228548 | A1 * | 9/2010 | Liu | G10L 15/065 |
| | | | | 704/E15.001 |
| 2019/0147876 | A1 | 5/2019 | Printz | |
| 2020/0005774 | A1 | 1/2020 | Yun | |
| 2020/0175962 | A1 * | 6/2020 | Thomson | G10L 15/30 |
| 2020/0175987 | A1 * | 6/2020 | Thomson | G10L 15/26 |
| 2020/0294528 | A1 * | 9/2020 | Perri | G06F 3/167 |
| 2022/0383853 | A1 * | 12/2022 | Xu | G10L 15/08 |

* cited by examiner

200

| ASR Transcription | Actual Transcription | Percentage |
|---|---|---|
| Pause | Pause | 50% |
| | Pose | 50% |
| Find | Find | 25% |
| | Five | 20% |
| | Fine | 30% |
| | Fault | 10% |
| | Other (Unknown) | 15% |

| Model Rules to be Implemented | Purpose |
|---|---|
| Contains /ȯ/ sound [au] | If the transcription is *Pause*, and we are somewhat confident that it contains "au" sound, then it is likely to be *Pause* |
| | If the transcription is *Find*, and we are very confident that it contains au sound, then it is likely to be *Fault* |
| Contains /ō/ sound [long o] | If the transcription is *Pause*, and we are somewhat confident that it contains "o" sound, then it is likely to be *Pose* |
| Starts with /n/ sound | If the transcription is *Find*, and we are somewhat confident that it starts with "n," then it is likely to be *Nine* |
| Contains /v/ sound | If the transcription is *Find*, and we are confident that it contains sound "v," then it is likely to be *Five* |

| ASR Transcription | Triggering Condition | Targeted Query |
|---|---|---|
| Pause | Step 1. Detects "o" sound and is 20% stronger than "au" sound (if any) | Pose |
| Find | Step 1. Detected starting with "n," at least 66% confident | Fine |
| | Step 2. Detected "v" sound, and is at least 80% confident | Five |
| | Step 3. Detected "au" sound, and is at least 85% confident | Fault |

RECEIVE A TRANSCRIPTION ASSOCIATED WITH A USER UTTERANCE

920

RECEIVE AN INDICATION OF ONE OR MORE ACOUSTIC FEATURES ASSOCIATED WITH THE USER UTTERANCE

930

DETERMINE THAT ONE OR MORE OVERRIDE TRIGGERING RULES ASSOCIATED WITH THE TRANSCRIPTION ARE SATISFIED

940

SEND A REPLACEMENT TRANSCRIPTION TO A USER DEVICE ASSOCIATED WITH THE USER UTTERANCE

1000

1010

RECEIVE USER UTTERANCE DATA
ASSOCIATED WITH A PLURALITY OF USER DEVICES

1020

DETERMINE A PLURALITY OF USER UTTERANCES ASSOCIATED
WITH ERRONEOUS SPEECH RECOGNITION TRANSCRIPTIONS

1030

DETERMINE A TRAINED ACOUSTIC MODEL

1100

1110

RECEIVE USER UTTERANCE DATA

1120

SEND THE USER UTTERANCE DATA TO A
SPEECH RECOGNITION COMPUTING DEVICE

1130

DETERMINE ONE OR MORE ACOUSTIC FEATURES
ASSOCIATED WITH THE USER UTTERANCE DATA

1140

SEND AN INDICATION OF THE ONE OR MORE ACOUSTIC FEATURES

1150

RECEIVE A TRANSCRIPTION OF A USER UTTERANCE

1200

1210

RECEIVE A TRANSCRIPTION ASSOCIATED WITH A USER UTTERANCE

1220

DETERMINE THAT THE TRANSCRIPTION IS NOT ASSOCIATED WITH A PLURALITY OF ACTIONS

1230

DETERMINE THAT ONE OR MORE OVERRIDE TRIGGERING RULES ARE SATISFIED

1240

DETERMINE AN UPDATED TRANSCRIPTION

1250

PERFORM AT LEAST ONE ACTION

METHODS, SYSTEMS AND APPARATUSES FOR IMPROVED SPEECH RECOGNITION AND TRANSCRIPTION

CROSS-REFERENCE TO RELATED APPLICATIONS

This application is a continuation of U.S. Non-Provisional application Ser. No. 18/068,613, filed on Dec. 20, 2022, which is a continuation of U.S. Non-Provisional application Ser. No. 17/141,926, filed on Jan. 5, 2021, and issued as U.S. Pat. No. 11,551,694, on Jan. 10, 2023, both of which are incorporated by reference in their entireties herein.

BACKGROUND

Automatic speech recognition ("ASR") engines use many technologies to determine transcriptions of user utterances (e.g., spoken words and phrases). These technologies include acoustic analysis, natural language processing, artificial intelligence, and so forth. Many ASR engines are designed to be generally applicable for all types of speech transcription without considering common error cases (e.g., incorrectly transcribed words or phrases). Other ASR engines maintain an override list of words or phrases for common error cases. The override list may be used by the ASR engine to override an incorrectly transcribed word or phrase with an alternative word or phrase corresponding to the incorrectly transcribed word or phrase within the override list (e.g., override "pause" to "pose"). Such an override list may be problematic, since it only presents a binary choice (e.g., override or do not override), and it is not tailored using historical user utterance data. These and other considerations are described herein.

SUMMARY

It is to be understood that both the following general description and the following detailed description are exemplary and explanatory only and are not restrictive. Systems, methods, and apparatuses for improved speech recognition and transcription of user utterances are described herein. Speech recognition techniques may be used to process user utterances, such as words or phrases, into actionable commands or queries that may be carried out by computing devices. For example, a user device may receive user utterance data as a user speaks into a microphone of the user device. The user device may be, for example, a remote control for a television. The user utterance data may be processed to determine a transcription indicating that the user spoke a command such as, "Turn on the TV." The transcription and/or an indication of the command may be sent to a computing device—such as the television or a set-top box—so that the command may be carried out (e.g., the television may be powered on). At times, user utterances may be incorrectly transcribed (e.g., due to background noise). To improve speech recognition and transcription capabilities, an acoustic model may be used. The acoustic model may be trained using historical user utterance data. The acoustic model, once trained, may override erroneous transcriptions. Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of the present description serve to explain the principles of the methods and systems described herein:

FIG. 2 shows an example data table;
FIG. 5 shows an example data table;
FIG. 6 shows an example data table.

DETAILED DESCRIPTION

Figure 1:
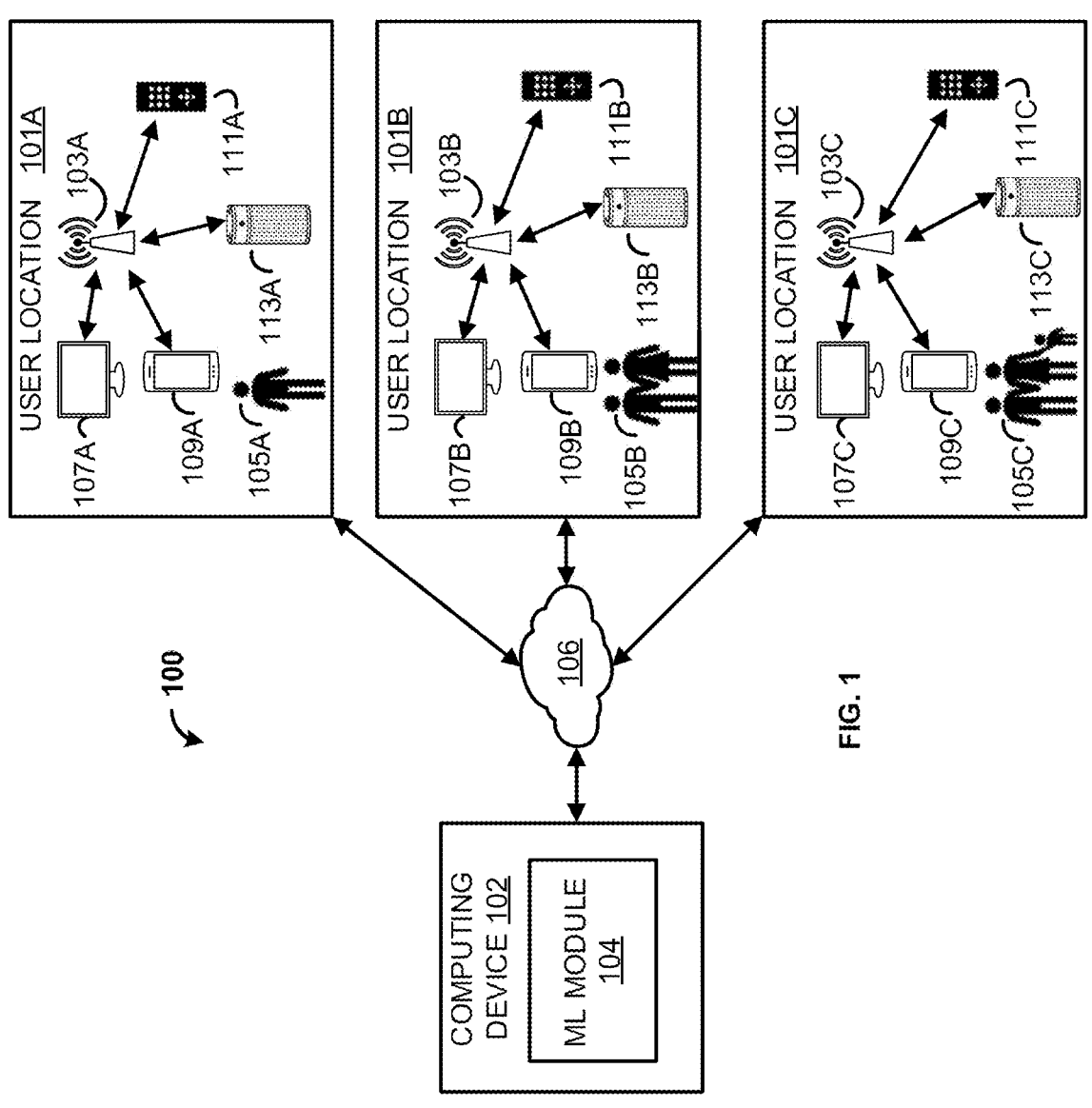
FIG. 1 shows an example system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

Methods, systems, and apparatuses for improved speech recognition and transcription of user utterances are described herein. A user utterance may be a word or phrase, such as a command or a query, received by an automatic speech recognition ("ASR") engine. The user utterance may be received by a user device, such a set-top box, a smart television, a computer, a mobile device, a tablet, etc. The ASR engine may be resident at the user device, or it may be resident at a server in communication with the user device. The ASR engine may process the user utterance to determine a transcription.

To improve speech recognition and transcription capabilities, user utterances may be processed by an ASR engine as well as an acoustic model. The ASR engine and the acoustic model may be resident at the user device, on a server in communication with the user device, or separated. For example, the ASR engine may be stored at, and execute on, the server, while the acoustic model may be stored at, and execute on, the user device—or vice versa.

The acoustic model may be trained using historical user utterance data. The acoustic model, once trained, may use a plurality of override triggering rules when determining whether to override a transcription determined by the ASR engine that may be erroneous. For example, the computing device may receive a transcription associated with a user utterance. The acoustic model may extract one or more acoustic features from the user utterance and send an indication of the one or more acoustic features to the computing device. The computing device, using the acoustic model, may determine whether the one or more acoustic features satisfy one or more of the plurality of override triggering rules.

The computing device may determine an updated transcription. For example, the computing device may determine that one or more of the override triggering rules are satisfied, and the computing device may determine an updated transcription. The updated transcription may be a transcription of the user utterance that is determined by a second ASR engine. The computing device may send the updated transcription to a user device associated with the user utterance. The user device may receive the updated transcription rather than the transcription determined by the ASR engine.

FIG. 1 shows a block diagram of an example system 100 for improved speech recognition and transcription. The system 100 may comprise a computing device 102 having a machine learning ("ML") module 104 resident thereon. The system 100 may comprise a plurality of user locations 101A, 101B, 101C each in communication with the computing device 102 via a network 106. Each of the plurality of user locations 101A, 101B, 101C may include a user(s) 105A, 105B, 105C, a gateway device 103A, 103B, 103C (e.g., a router, access point, etc.), a computing device 107A, 107B, 107C (e.g., set-top box, laptop, desktop, smart TV, etc.), a user device 109A, 109B, 109C, a smart remote 111A, 111B, 111C, and a smart device 113A, 113B, 113C. While each of the plurality of user locations 101A, 101B, 101C are shown in FIG. 1 as having only one gateway device 103A, 103B, 103C (e.g., a router, access point, etc.), one computing device 107A, 107B, 107C (e.g., set-top box, laptop, desktop, smart TV, etc.), one user device 109A, 109B, 109C, one smart remote 111A, 111B, 111C, and one smart device 113A, 113B, 113C, it is to be understood that each of the plurality of user locations 101A, 101B, 101C may include more than one of each of the aforementioned devices. Further, it is to be understood that each of the plurality of user locations 101A, 101B, 101C may not include all of the aforementioned devices, although each is shown in FIG. 1 as including at least one of each. The user device 109A, 109B, 109C and/or the smart device 113A, 113B, 113C may be a computing device, a smart speaker, an Internet-capable device, a sensor, a light bulb, a camera, an actuator, an appliance, a game controller, audio equipment, one or more thereof, and/or the like.

Any of the aforementioned devices at the plurality of user locations 101A, 101B, 101C (collectively referred to herein as "user devices") may be capable of processing user utterances. Each of the user devices may comprise a speech recognition computing device, a speech recognition module, an automatic speech recognition ("ASR") engine, a combination thereof, and/or the like. For example, each of the user devices may comprise a speech recognition computing device, a speech recognition module, and/or an ASR engine that is resident thereon or otherwise in communication therewith (e.g., at a server). For purposes of explanation herein, an "ASR engine" may be described as the entity performing speech recognition and transcription. However, it is to be understood that the functionality of an "ASR engine" described herein may apply equally to a user device, a speech recognition computing device, and/or a speech recognition module. For example, the functionality of an "ASR engine" described herein may be performed by a user device, a speech recognition computing device, a speech recognition module of a user device, a speech recognition module of a speech recognition computing device, etc. The term "ASR engine" is used herein for ease of explanation and is not intended to be limiting to a particular device type or device class. Any computing device, user device, gateway device, smart device, etc., described herein may perform some—or all—actions of an "ASR engine" as described herein.

A user utterance may be a word or phrase, such as a command or a query, received by an ASR engine via one of the user devices. The ASR engine may process the user utterance to determine a transcription. For example, the user utterance may relate to controlling one of the user devices, such as the computing device 107A, and the user utterance may comprise a name of a content item (e.g., a song, a movie, a show, etc.) or a command related to a content item (e.g., "Watch Fox News," "Play Metallica," "Record the next episode of Seinfeld," etc.). The computing device 107A may process the user utterance data via the ASR engine and take an appropriate action, such as providing requested content, taking a requested action, etc. For example, the user utterance may relate to a query received by one of the user devices, such as the smart device 113A (e.g., "What will the high temperature be tomorrow?" "When is the next episode of Shark Tank?" etc.). The smart device 113A may process the user utterance data via the ASR engine and determine an appropriate response to the query, such as answering a question or providing requested information.

At times, the ASR engine may incorrectly transcribe the user utterance, which may cause the user device to take an incorrect action or determine an incorrect response. For example, the user utterance may be a command for the computing device 107A to play a movie "Pose", but the ASR engine may transcribe the user utterance as "Pause" and therefore not take the appropriate action (e.g., watching the movie). For example, the ASR engine associated with the smart device 113A may erroneously process ambient sound that was incorrectly detected as being a user utterance, and in response the smart device 113A may take an incorrect action (e.g., providing a response to a non-existent query).

To improve speech recognition and transcription capabilities, the computing device 102 may collect/aggregate historical user utterance data received by the user devices at the plurality of user locations 101A, 101B, 101C over a period of time (e.g., a quantity of minutes, hours, days, months, etc.). The historical user utterance data may comprise user utterances previously processed by the ASR engine(s) associated with the user devices at the plurality of user locations 101A, 101B, 101C and corresponding transcriptions determined by the ASR engine(s). For example, the historical user utterance data may be associated with a plurality of user device query histories and/or commands received by the user devices. The computing device 102 may analyze the historical user utterance data and determine a plurality of user utterances that are associated with erroneous ASR engine transcriptions.

For example, the computing device 102 may analyze the plurality of user device query histories and/or commands received by the user devices to determine which of the user utterances previously processed by the ASR engine(s) are commonly transcribed incorrectly. The historical user utterance data may comprise user behavior data associated with each of the plurality of user device query histories and/or commands. The user behavior data for a query history and/or command may comprise a log or history file indicative of user behavior. For example, the user behavior data may indicate that the query and/or command was processed more than once, thereby indicating the associated word(s) and/or phrase(s) is commonly transcribed incorrectly. For example, the user behavior data may indicate that the query and/or command was processed and the responsive action taken by the user device was overridden by a user, thereby indicating the associated word(s) and/or phrase(s) is commonly transcribed incorrectly.

Table 200 in FIG. 2 shows an example distribution for a plurality of user utterances that the computing device 102 may determine are associated with erroneous ASR engine transcriptions. The example distribution shown in the table 200 may be based on the historical user utterance data analyzed by the computing device 102. As shown in the table 200, the computing device 102 may determine an ASR transcription (e.g., column 202), one or more actual user utterances (e.g., column 204) associated with the corresponding ASR transcription, and a percentage for each of the one or more actual user utterances (e.g., column 206) for the corresponding ASR transcription. For example, the table 200 shows that the ASR engine determines a transcription of "Pause" correctly (e.g., the transcription corresponds to the actual user utterance) only 50% of the time, while the other 50% of user utterances were actually "Pose."

Figure 3:
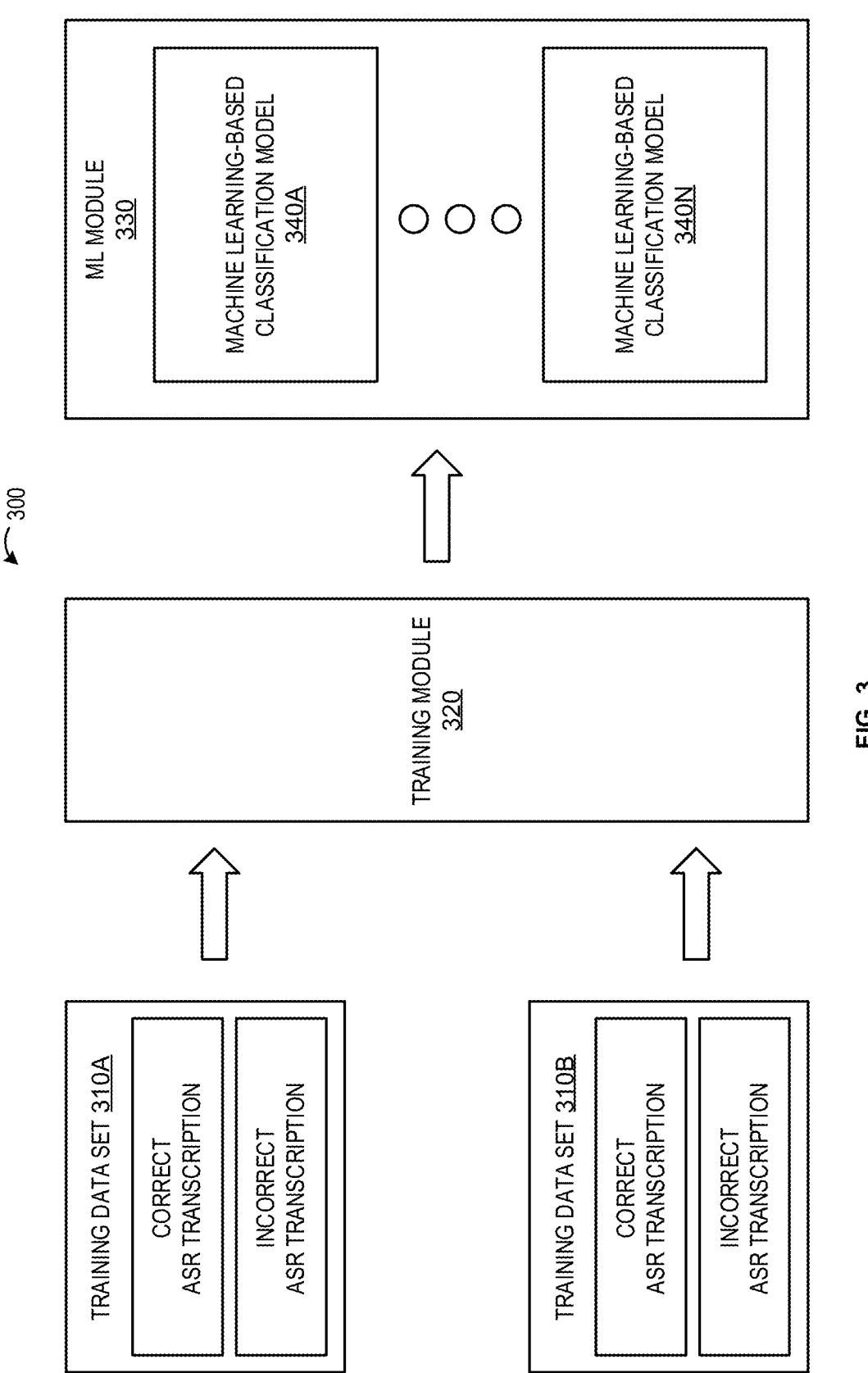
FIG. 3 shows an example machine learning system.

FIG. 3 shows a system 300. The system 300 may be configured to use machine learning ("ML") techniques to train, based on an analysis of one or more training data sets 310A and 310B by a training module 320, at least one ML module 330 that is configured to override erroneous automatic speech recognition ("ASR") transcriptions. The ML module 330 may correspond to the ML module 104 of the computing device 102 shown in FIG. 1. For example, the computing device 102 may send the plurality of user device query histories and/or commands received by the user devices at the plurality of user locations 101A, 101B, 101C and the distribution for the plurality of user utterances shown in the table 200 to the training module 320.

The training data set 310A may comprise labeled ASR transcriptions (e.g., labeled as being correct). The training data set 310B may comprise labeled ASR transcriptions (e.g., labeled as being incorrect). The labels may comprise correct (e.g., correctly transcribed) and incorrect (e.g., incorrectly transcribed).

A subset of the plurality of user utterances may be randomly assigned to the training data set 310B or to a testing data set. In some implementations, the assignment of data to a training data set or a testing data set may not be completely random. In this case, one or more criteria may be used during the assignment, such as ensuring that similar numbers of user utterances with different labels are in each of the training and testing data sets. In general, any suitable method may be used to assign the data to the training or testing data sets, while ensuring that the distributions of correct and incorrect labels are somewhat similar in the training data set and the testing data set.

The training module 320 may train the ML module 330 by extracting a feature set from a first subset of the plurality of user utterances (e.g., labeled as being correct) in the training data set 310A according to one or more feature selection techniques. The training module 320 may further define the feature set obtained from the training data set 310A by applying one or more feature selection techniques to the second subset of the plurality of user utterances (e.g., labeled as being incorrect) in the training data set 310B that may include statistically significant features of positive examples (e.g., labeled as being correct) and statistically significant features of negative examples (e.g., labeled as being incorrect). The training module 320 may train the ML module 330 by extracting a feature set from the training data set 310B that may include statistically significant features of positive examples (e.g., labeled as being correct) and statistically significant features of negative examples (e.g., labeled as being incorrect).

The training module 320 may extract a feature set from the training data set 310A and/or the training data set 310B in a variety of ways. The training module 320 may perform feature extraction multiple times, each time using a different feature-extraction technique. In an example, the feature sets determine/generated using the different techniques may each be used to determine/generate different machine learning-based classification models 340. For example, the feature set with the highest quality metrics may be selected for use in training. The training module 320 may use the feature set(s) to build one or more machine learning-based classification models 340A-340N that are configured to indicate whether a new user utterance (e.g., based on new user utterance data) was correctly or incorrectly transcribed by an associated ASR engine. Each of the one or more machine learning-based classification models 340A-340N may be an acoustic model that corresponds to a transcribed word and/or phrase, such as the ASR transcriptions shown in column 202 of the table 200.

The training data set 310A and/or the training data set 310B may be analyzed to determine any dependencies, associations, and/or correlations between acoustic features and the correct/incorrect labels in the training data set 310A and/or the training data set 310B. The identified correlations may have the form of a list of acoustic features that are associated with different correct/incorrect labels. The acoustic features may be considered as features (or variables) in the machine learning context. The term "feature," as used herein, may refer to any characteristic of an item of data that may be used to determine whether the item of data falls within one or more specific categories. By way of example, the features described herein may comprise one or more acoustic features associated with a user utterance.

A feature selection technique may comprise one or more feature selection rules. The one or more feature selection rules may comprise an acoustic feature occurrence rule. The acoustic feature occurrence rule may comprise determining which acoustic features in the training data set 310A occur over a threshold number of times and identifying those acoustic features that satisfy the threshold as candidate features. For example, any acoustic features that appear greater than or equal to 3 times in the training data set 310A may be considered as candidate features. Any acoustic features appearing less than 3 times may be excluded from consideration as a feature.

A single feature selection rule may be applied to select features or multiple feature selection rules may be applied to select features. The feature selection rules may be applied in a cascading fashion, with the feature selection rules being applied in a specific order and applied to the results of the previous rule. For example, the acoustic feature occurrence rule may be applied to the training data set 310A to determine/generate a first list of acoustic features. A final list of candidate acoustic features may be analyzed according to additional feature selection techniques to determine one or more candidate acoustic feature groups (e.g., groups of acoustic features that may be used to predict whether an ASR transcription for a new user utterance is correct or incorrect). Any suitable computational technique may be used to identify the candidate acoustic feature groups using any feature selection technique such as filter, wrapper, and/or embedded methods. One or more candidate acoustic feature groups may be selected according to a filter method. Filter methods may include, for example, Pearson's correlation, linear discriminant analysis, analysis of variance (ANOVA), chi-square, combinations thereof, and the like. The selection of features according to filter methods are independent of any machine learning algorithms. Instead, features may be selected on the basis of scores in various statistical tests for their correlation with the outcome variable (e.g., correct/incorrect).

For example, one or more candidate acoustic feature groups may be selected according to a wrapper method. A wrapper method may be configured to use a subset of features and train a machine learning model using the subset of features. Based on the inferences that drawn from a previous model, features may be added and/or deleted from the subset. Wrapper methods may include, for example, forward feature selection, backward feature elimination, recursive feature elimination, combinations thereof, and the like. For example, forward feature selection may be used to identify one or more candidate acoustic feature groups. Forward feature selection is an iterative method that begins with no feature in the machine learning model. In each iteration, the feature which best improves the model is added until an addition of a new variable does not improve the performance of the machine learning model. For example, backward elimination may be used to identify one or more candidate acoustic feature groups. Backward elimination is an iterative method that begins with all features in the machine learning model. In each iteration, the least significant feature is removed until no improvement is observed on removal of features. Recursive feature elimination may be used to identify one or more candidate acoustic feature groups. Recursive feature elimination is a greedy optimization algorithm which aims to find the best performing feature subset. Recursive feature elimination repeatedly creates models and keeps aside the best or the worst performing feature at each iteration. Recursive feature elimination constructs the next model with the features remaining until all the features are exhausted. Recursive feature elimination then ranks the features based on the order of their elimination.

For example, one or more candidate acoustic feature groups may be selected according to an embedded method. Embedded methods combine the qualities of filter and wrapper methods. Embedded methods may include, for example, Least Absolute Shrinkage and Selection Operator (LASSO) and ridge regression which implement penalization functions to reduce overfitting. For example, LASSO regression performs L1 regularization which adds a penalty equivalent to absolute value of the magnitude of coefficients and ridge regression performs L2 regularization which adds a penalty equivalent to square of the magnitude of coefficients.

After the training module 320 has determine/generated a feature set(s), the training module 320 may determine/generate a machine learning-based classification model 340 based on the feature set(s). A machine learning-based classification model may refer to a complex mathematical model for data classification that is determined/generated using machine-learning techniques. In one example, the machine learning-based classification model 340 may include a map of support vectors that represent boundary features. By way of example, boundary features may be selected from, and/or represent the highest-ranked features in, a feature set.

The training module 320 may use the feature sets extracted from the training data set 310A and/or the training data set 310B to build a machine learning-based classification model 340A-340N for each classification category (e.g., correct, incorrect). In some examples, the machine learning-based classification models 340A-340N may be combined into a single machine learning-based classification model 340. Similarly, the ML module 330 may represent a single classifier containing a single or a plurality of machine learning-based classification models 340 and/or multiple classifiers containing a single or a plurality of machine learning-based classification models 340.

The extracted features (e.g., one or more candidate acoustic features) may be combined in a classification model trained using a machine learning approach such as discriminant analysis; decision tree; a nearest neighbor (NN) algorithm (e.g., k-NN models, replicator NN models, etc.); statistical algorithm (e.g., Bayesian networks, etc.); clustering algorithm (e.g., k-means, mean-shift, etc.); neural networks (e.g., reservoir networks, artificial neural networks, etc.); support vector machines (SVMs); logistic regression algorithms; linear regression algorithms; Markov models or chains; principal component analysis (PCA) (e.g., for linear models); multi-layer perceptron (MLP) ANNs (e.g., for non-linear models); replicating reservoir networks (e.g., for non-linear models, typically for time series); random forest classification; deep neural networks (e.g., convolutional neural network, Long Short-Term Memory (LSTM) networks, etc.); a combination thereof and/or the like. The resulting ML module 330 may comprise a decision rule or a mapping that each candidate acoustic feature to assign an ASR transcription for a new user utterance to a class (e.g., correct vs. incorrect).

The candidate acoustic feature and the ML module 330 may be used to predict the correct/incorrect statuses of the subset of the plurality of user utterances in the testing data set. In one example, the result for each test user utterance may include a confidence level that corresponds to a likelihood or a probability that the corresponding ASR transcription belongs in the predicted correct/incorrect status. The confidence level may be a value between zero and one, and it may represent a likelihood that the corresponding test user utterance belongs to a correct/incorrect status. In one example, when there are two statuses (e.g., correct and incorrect), the confidence level may correspond to a value p, which refers to a likelihood that a particular user utterance belongs to the first status (e.g., correct). In this case, the value 1−p may refer to a likelihood that the particular test user utterance belongs to the second status (e.g., incorrect). In general, multiple confidence levels may be determined for each test user utterance and for each candidate acoustic feature when there are more than two statuses. A top performing candidate acoustic feature may be determined by comparing the result obtained for each test user utterance with the known correct/incorrect status for each test user utterance. In general, the top performing candidate acoustic feature will have results that closely match the known correct/incorrect statuses.

The top performing candidate acoustic feature may be used to predict the correct/incorrect status of an ASR transcription. For example, new user utterance data associated with an ASR transcription may be determined/received. The user utterance data may be sent to the ML module 330 which may, based on the top performing candidate acoustic feature, classify the ASR transcription as being correct or as being incorrect.

Figure 4:
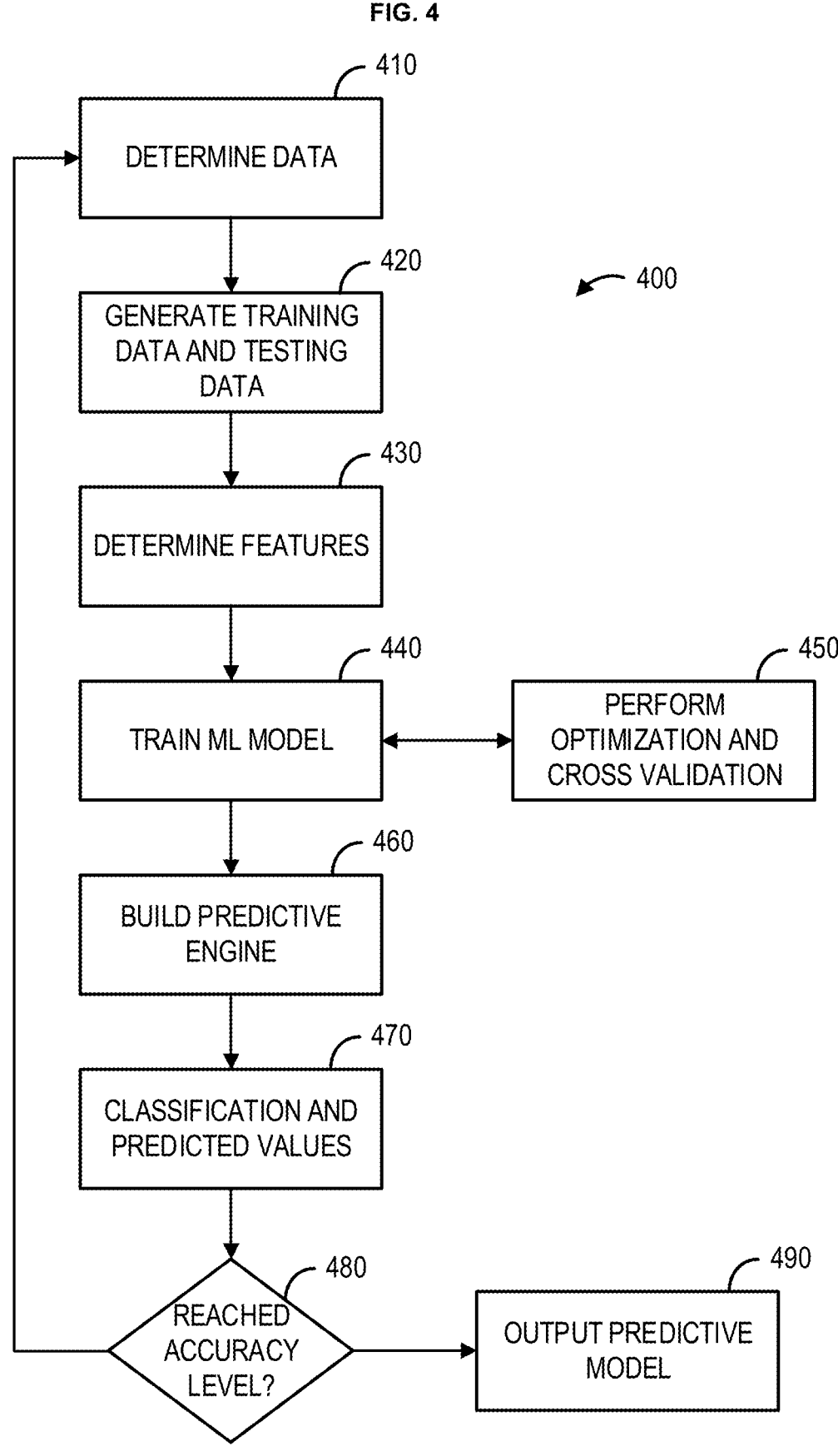
FIG. 4 shows an example process flowchart.

FIG. 4 is a flowchart of an example method 400 for configuring the ML module 330. For example, the method 400 may be used to train the ML module 330 using the training module 320. The training module 320 may implement supervised, unsupervised, and/or semi-supervised (e.g., reinforcement based) learning-based classification models 340. The method 400 shown in FIG. 4 is an example of a supervised learning method; variations of this example method are discussed below, however, other methods may be analogously implemented to train unsupervised and/or semi-supervised learning models.

At step 410, first historical user utterance data (e.g., previously processed user utterances) and second historical user utterance data (e.g., previously processed user utterances) may be determined (e.g., accessed, received, retrieved, etc.). The first historical user utterance data and the second historical user utterance data may each contain one or more datasets, and each dataset may be associated with a particular transcribed word(s) or phrase(s). Each dataset may include a labeled list of user utterances and corresponding ASR transcriptions (e.g., correct vs. incorrect). The labels may comprise correct or incorrect.

At step 420, a training data set and a testing data set may be determined/generated. The training data set and the testing data set may be determined/generated by randomly assigning labeled user utterances from the second historical user utterance data to either the training data set or the testing data set. In some implementations, the assignment of user utterances as training or testing samples may not be completely random. For example, only the labeled user utterances for a specific transcribed word(s) or phrase(s) may be used to determine/generate the training data set and the testing data set. For example, a majority of the labeled user utterances for the specific transcribed word(s) or phrase (s) may be used to determine/generate the training data set. For example, 75% of the labeled user utterances for the specific transcribed word(s) or phrase(s) may be used to determine/generate the training data set and 25% may be used to determine/generate the testing data set.

The method 400 may determine (e.g., extract, select, etc.), at step 430, one or more features that may be used by, for example, a classifier to differentiate among different classifications (e.g., correct vs. incorrect). The one or more features may comprise a set of acoustic features of an acoustic model. For example, the method 400 may determine a set acoustic features from the first historical user utterance data. For example, the method 400 may determine a set of acoustic features from the second historical user utterance data. In a further example, a set of acoustic features may be determined from labeled user utterances for a specific transcribed word(s) or phrase(s) different than a transcribed word(s) or phrase(s) associated with the labeled user utterances of the training data set and the testing data set. In other words, labeled user utterances for the different transcribed word(s) or phrase(s) may be used for feature determination, rather than for training a machine learning model. The training data set may be used in conjunction with the labeled user utterances for the different transcribed word(s) or phrase(s) to determine the one or more acoustic features for the acoustic model. The labeled user utterances for the different transcribed word(s) or phrase(s) may be used to determine an initial set of acoustic features, which may be further reduced using the training data set.

FIG. 5 shows an example portion of the acoustic model and the one or more acoustic features in a table 500. As shown in the table 500, the acoustic model may include one or more acoustic model rules, shown in column 502, that each have a corresponding purpose, shown in column 540. For example, an acoustic model rule may relate to user utterances that contains the /ô/ sound "au" (e.g., /ô/). The acoustic model rule may be used to determine whether a corresponding ASR transcription is correct or incorrect. For example, an ASR transcription for a user utterance may be "Pause." If the acoustic model indicates a moderate level of confidence that the user utterance contains the "au" sound, then the acoustic model may indicate that the ASR transcription is likely correct. However, if the ASR transcription for the user utterance is "Find," and the acoustic model indicates a high level of confidence that the user utterance contains the "au" sound, then the acoustic model may indicate that the ASR transcription is likely incorrect and should be replaced with "Fault."

The method 400 may train one or more machine learning models using the one or more acoustic features at step 440. In one example, the machine learning models may be trained using supervised learning. For example, other machine learning techniques may be employed, including unsupervised learning and semi-supervised. The machine learning models trained at 440 may be selected based on different criteria depending on the problem to be solved and/or data available in the training data set. For example, machine learning classifiers may suffer from different degrees of bias. Accordingly, more than one machine learning model may be trained at 440, optimized, improved, and cross-validated at step 450.

The method 400 may select one or more machine learning models to build a predictive model at 460 (e.g., an acoustic model). The predictive model may be evaluated using the testing data set. The predictive model may analyze the testing data set and determine/generate classification values and/or predicted values at step 470. Classification and/or prediction values may be evaluated at step 480 to determine whether such values have achieved a desired accuracy level. Performance of the predictive model may be evaluated in a number of ways based on a number of true positives, false positives, true negatives, and/or false negatives classifications of the plurality of data points indicated by the predictive model.

For example, the false positives of the predictive model may refer to a number of times the predictive model incorrectly classified an ASR transcription for a user utterance as correct that was in reality incorrect. Conversely, the false negatives of the predictive model may refer to a number of times the machine learning model classified an ASR transcription for a user utterance as incorrect when, in fact, the ASR transcription for a user utterance was correct. True negatives and true positives may refer to a number of times the predictive model correctly classified one or more ASR transcriptions as correct or incorrect. Related to these measurements are the concepts of recall and precision. Generally, recall refers to a ratio of true positives to a sum of true positives and false negatives, which quantifies a sensitivity of the predictive model. Similarly, precision refers to a ratio of true positives to a sum of true and false positives. When such a desired accuracy level is reached, the training phase ends and the predictive model (e.g., the ML module 330) may be output at step 490; when the desired accuracy level is not reached, however, then a subsequent iteration of the method 400 may be performed starting at step 410 with variations such as, for example, considering a larger collection of historical user utterance data.

The predictive model (e.g., the acoustic model) may include a plurality of override triggering rules, as described herein. FIG. 6 shows an example table 600 including example override triggering rules. For example, as shown in column 602 of the table 600, a transcription determined by an ASR engine for a user utterance may be the word "Pause." Column 604 shows a triggering condition for a first override triggering rule associated with transcriptions of the word "Pause." As indicated in the table 600, the first override triggering rule may be satisfied when at least one acoustic feature corresponding to the user utterance having the "o" sound is associated with a corresponding level of confidence that is 20% stronger than a level of confidence for another acoustic feature corresponding to the "au" sound. That is, the first override triggering rule may be satisfied when the level of confidence indicating that the acoustic feature of the "o" sound is present outweighs the level of confidence indicating that the acoustic feature of the "au" sound is present by at least 20% or more. As indicated in the table 600, when the first override triggering rule is satisfied, an updated transcription of "Pose" may be determined, because the level of confidence for the "o" sound outweighs the level of confidence for the "au" sound by at least 20% or more.

Figure 7:
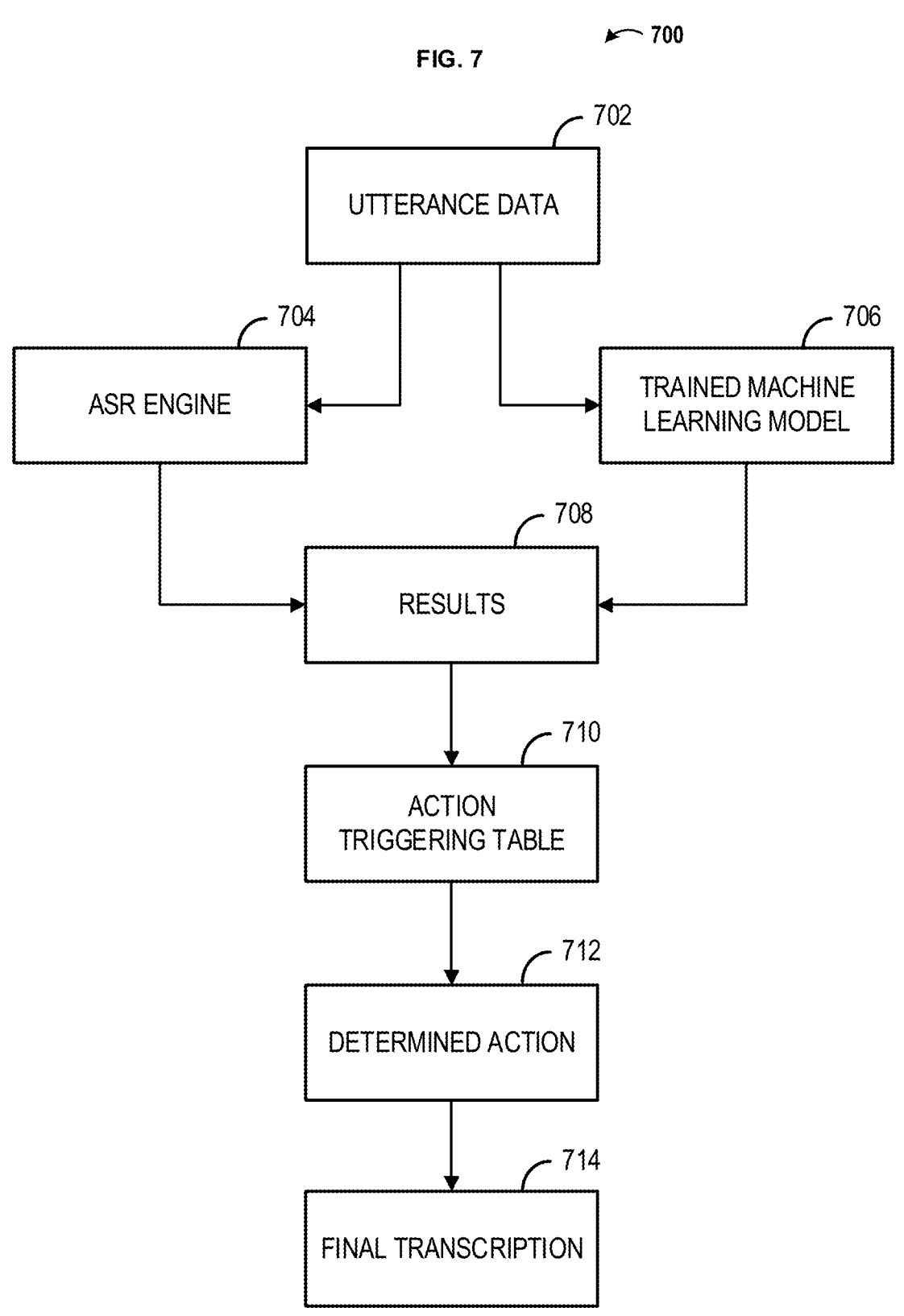
FIG. 7 shows an example process flowchart.

FIG. 7 shows a flowchart for an example process 700. The computing device 102 may use the acoustic model and the plurality of override triggering rules when determining whether to override a transcription determined by the ASR engine. For example, the computing device 102 may receive a new user utterance at step 702. Data related to the user utterance may be sent at step 704 to an ASR engine. The data related to the user utterance may be sent at step 706, which may occur substantially simultaneously with step 704, to the acoustic model (e.g., a machine-learning based model). The acoustic model may extract one or more acoustic features from the user utterance and determine an indication of the one or more acoustic features at step 708. At step 708, a transcription may be received from the ASR engine. The indication of the one or more acoustic features may comprise a level of confidence that each of the one or more acoustic features are present in the user utterance. The computing device 102, using the acoustic model, may determine whether the one or more acoustic features satisfy one or more of the plurality of override triggering rules at step 710. As described herein, an override triggering rule may be satisfied when the level of confidence for at least one acoustic feature meets or exceeds at least one confidence threshold. At step 712, the computing device may determine whether one or more of the override triggering rules are satisfied. If one or more of the override triggering rules are satisfied, the computing device 102 may determine an updated transcription at step 714. The computing device 102 may be a server (e.g., resident in the cloud), in which case the computing device 102 may send the updated transcription to a user device associated with the user utterance. In this way, the user device would receive the updated transcription rather than the transcription determined by the ASR engine. For example, the computing device 102 may be the user device, in which case the computing device 102 would output/display the updated transcription rather than the transcription determined by the ASR engine. On the other hand, if one or more of the override triggering rules are not satisfied, then the computing device 102 may output/display the ASR engine's transcription at 714.

Figure 8:
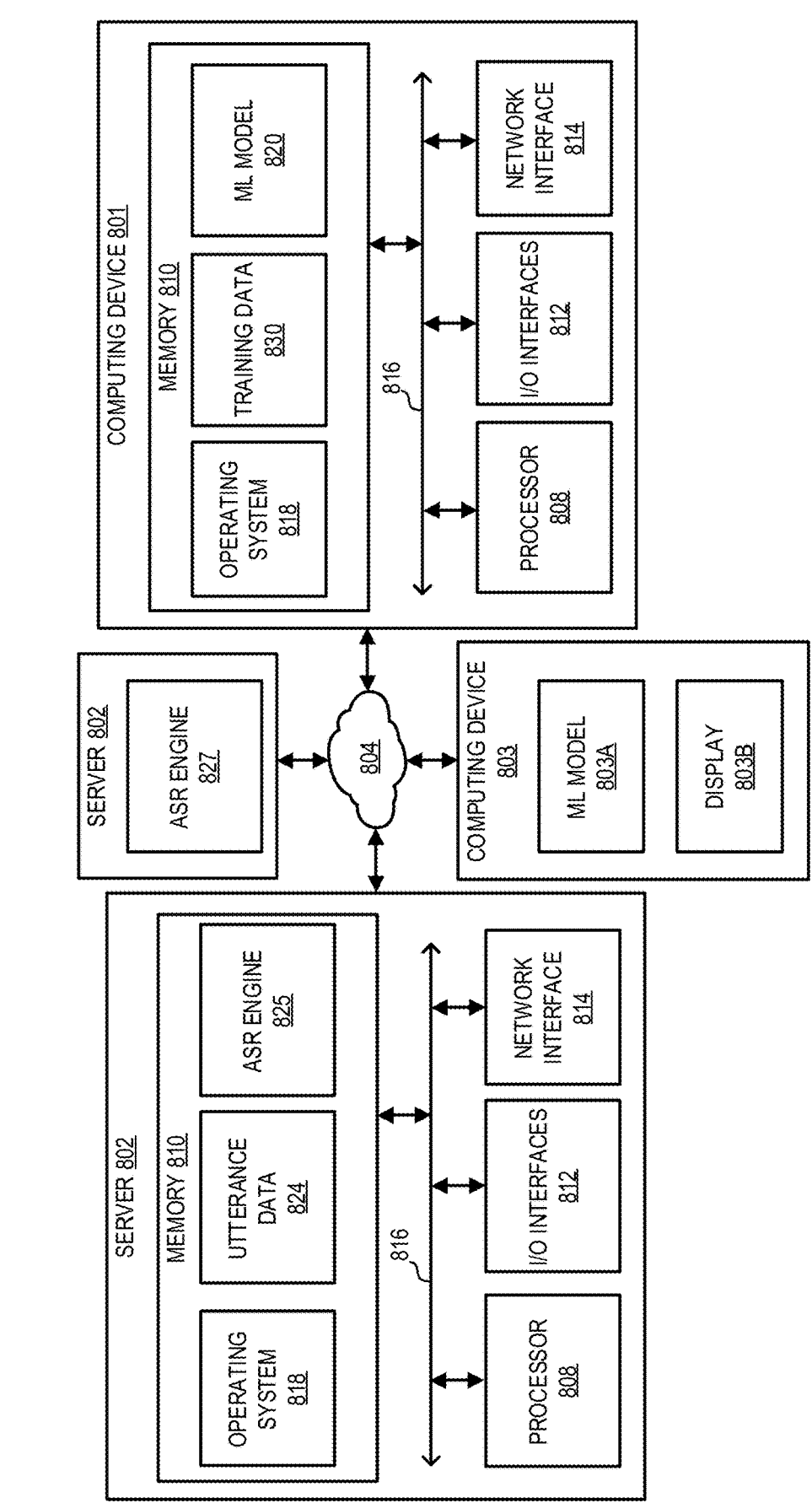
FIG. 8 shows an example system.

As discussed herein, the present methods and systems may be computer-implemented. FIG. 8 shows a block diagram depicting a system/environment 800 comprising nonlimiting examples of a computing device 801 and a server 802 connected through a network 804. Either of the computing device 801 or the server 802 may be a computing device such as the computing device 102. In an aspect, some or all steps of any described method may be performed on a computing device as described herein. The computing device 801 may comprise one or multiple computers configured to store one or more of the training module 320, the training data 310 (e.g., labeled ASR transcriptions), the acoustic model, and/or the like. The server 802 may comprise one or multiple computers configured to store historical user utterance data 824 (e.g., a plurality of historical user utterances). Multiple servers 802 may communicate with the computing device 801 via the through the network 804.

The computing device 801 and the server 802 may be a digital computer that, in terms of hardware architecture, generally includes a processor 808, system memory 810, input/output (I/O) interfaces 812, and network interfaces 814. These components (808, 810, 812, and 814) are communicatively coupled via a local interface 816. The local interface 816 may be, for example, but not limited to, one or more buses or other wired or wireless connections, as is known in the art. The local interface 816 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 808 may be a hardware device for executing software, particularly that stored in system memory 810. The processor 808 may be any custom made or commercially available processor, a central processing unit (CPU), an auxiliary processor among several processors associated with the computing device 801 and the server 802, a semiconductor-based microprocessor (in the form of a microchip or chip set), or generally any device for executing software instructions. When the computing device 801 and/ or the server 802 is in operation, the processor 808 may be configured to execute software stored within the system memory 810, to communicate data to and from the system memory 810, and to generally control operations of the computing device 801 and the server 802 pursuant to the software.

The I/O interfaces 812 may be used to receive user input from, and/or for providing system output to, one or more devices or components. User input may be received via, for example, a keyboard and/or a mouse. System output may be provided via a display device and a printer (not shown). I/O interfaces 812 may include, for example, a serial port, a parallel port, a Small Computer System Interface (SCSI), an infrared (IR) interface, a radio frequency (RF) interface, and/or a universal serial bus (USB) interface.

The network interface 814 may be used to transmit and receive from the computing device 801 and/or the server 802 on the network 804. The network interface 814 may include, for example, a 8BaseT Ethernet Adaptor, a 80BaseT Ethernet Adaptor, a LAN PHY Ethernet Adaptor, a Token Ring Adaptor, a wireless network adapter (e.g., WiFi, cellular, satellite), or any other suitable network interface device. The network interface 814 may include address, control, and/or data connections to enable appropriate communications on the network 804.

The system memory 810 may include any one or combination of volatile memory elements (e.g., random access memory (RAM, such as DRAM, SRAM, SDRAM, etc.)) and nonvolatile memory elements (e.g., ROM, hard drive, tape, CDROM, DVDROM, etc.). Moreover, the system memory 810 may incorporate electronic, magnetic, optical, and/or other types of storage media. Note that the system memory 810 may have a distributed architecture, where various components are situated remote from one another, but may be accessed by the processor 808.

The software in system memory 810 may include one or more software programs, each of which comprises an ordered listing of executable instructions for implementing logical functions. In the example of FIG. 8, the software in the system memory 810 of the computing device 801 may comprise the training module 320 (or subcomponents thereof), the training data 830, an ML model 820, and a suitable operating system (O/S) 818. In the example of FIG. 8, the software in the system memory 810 of the server 802 may comprise, the historical user utterance data 824, and a suitable operating system (O/S) 818. The operating system 818 essentially controls the execution of other computer programs and determines scheduling, input-output control, file and data management, memory management, and communication control and related services.

The system/environment 800 may further comprise a computing device 803. The computing device 803 may be a user device, such as one of the user devices at the plurality of user locations 101A, 101B, 101C. The computing device 803 may use a set of override triggering rules stored in an ML module 803A to determine and output ASR transcriptions at a display 803B. For example, the computing device 803 may receive user utterance data from a user device, which may include one more acoustic features and an indication of an ASR transcription. Using the user utterance data and the override triggering rules stored in the ML module 803A, the computing device 803 may determine a probability. For example, the probability may be indicative of a level of confidence that the ASR transcription was correct. The computing device 803 may use the probability and override triggering rules to determine whether the ASR transcription should be overridden, and either the ASR transcription or an updated transcription may be output at the display 803B.

For purposes of illustration, application programs and other executable program components such as the operating system 818 are shown herein as discrete blocks, although it is recognized that such programs and components may reside at various times in different storage components of the computing device 801 and/or the server 802. An implementation of the training module 320 may be stored on or transmitted across some form of computer readable media. Any of the disclosed methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" may comprise volatile and non-volatile, removable and non-removable media implemented in any methods or technology for storage of information such as computer readable instructions, data structures, program modules, or other data. Exemplary computer storage media may comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

Figure 9:
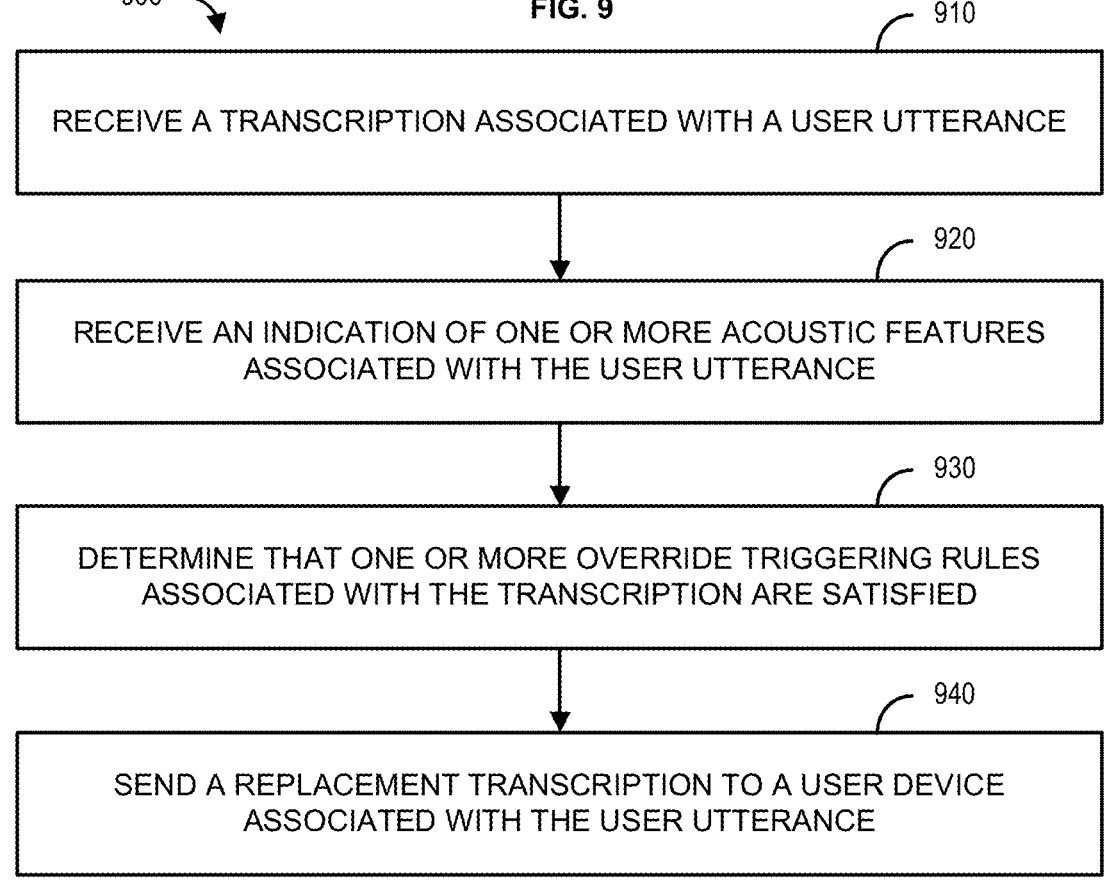
FIG. 9 shows a flowchart for an example method.

FIG. 9 shows a flowchart of an example method 900 for improving speech recognition and transcription. The method 900 may be performed in whole or in part by a single computing device, a plurality of computing devices, and the like. For example, the computing device 102, the training module 320, the server 802, the computing device 801, and/or the computing device 803 may be configured to perform the method 900.

At step 910, a computing device may receive a transcription associated with a user utterance. The computing device may receive the transcription from a speech recognition computing device. The speech recognition computing device may comprise an automatic speech recognition (ASR) engine. The user utterance may be a word or phrase, such as a command or a query. The ASR engine may be resident at the computing device, or it may be resident at a server in communication with the computing device. The ASR engine may process the user utterance to determine a transcription. For example, the user utterance may relate to controlling a computing device that outputs audio and/or video content, and the user utterance may comprise a name of a content item or a command related to a content item. For example, the user utterance may relate to a query.

At step 920, the computing device may receive an indication of one or more acoustic features. The one or more acoustic features may be associated with the user utterance. The computing device may receive the indication of the one or more acoustic features from an acoustic model. The user utterance may be processed by the ASR engine as well as the acoustic model. The acoustic model may be resident at the computing device, on a server in communication with the computing device, or separated. For example, the ASR engine may be stored at, and execute on, the server, while the acoustic model may be stored at, and execute on, the computing device—or vice versa.

The acoustic model may be trained using historical user utterance data. To determine/generate and train the acoustic model, the computing device may receive user utterance data associated with a plurality of user devices. The user utterance data may comprise historical data related to user utterances previously processed by the ASR engine and corresponding transcriptions determined by the ASR engine. For example, the historical data may be associated with a plurality of user device query histories and/or commands. The computing device may analyze the user utterance data and determine a plurality of user utterances that are associated with erroneous ASR engine transcriptions. For example, the erroneous ASR engine transcriptions may be indicative of words and/or phrases that were incorrectly transcribed by the ASR engine.

The computing device may use the plurality of user utterances and the erroneous ASR engine transcriptions to determine/generate the acoustic model. For example, the computing device may comprise, or otherwise be in communication with, a machine learning ("ML") module. The ML module may extract one or more acoustic features from each user utterance associated with each of the plurality of user utterances. When extracting the one or more acoustic features, the ML module may use one or more ML techniques. The erroneous ASR engine transcriptions and the extracted one or more acoustic features may be used by the ML module to determine/generate a plurality of override triggering rules. The ML module may in turn use the plurality of override triggering rules to train the acoustic model using one or more ML techniques.

At step 930, the computing device may determine that one or more of the override triggering rules are satisfied. The computing device may determine that the one or more override triggering rules are satisfied based on the one or more acoustic features. For example, the indication of the one or more acoustic features may comprise a level of confidence that each of the one or more acoustic features are present in the user utterance. The computing device, using the acoustic model, may determine whether the one or more acoustic features satisfy one or more of the plurality of override triggering rules. An override triggering rule may be satisfied when the level of confidence for at least one acoustic feature meets or exceeds at least one confidence threshold. For example, the transcription determined by the ASR engine may be the word "Pause," and a first override triggering rule may be associated with transcriptions of the word "Pause." The first override triggering rule may be satisfied when the at least one acoustic feature is the "o" sound and the corresponding level of confidence is 20% that the "o" sound is present is stronger than a level of confidence for another acoustic feature corresponding to the "au" sound. That is, the first override triggering rule may be satisfied when the level of confidence indicating that the acoustic feature of the "o" sound is present outweighs the level of confidence indicating that the acoustic feature of the "au" sound is present by at least 20% or more.

At step 940, the computing device may determine an updated transcription to a user device associated with the user utterance. The computing device may determine the updated transcription based on the one or more override triggering rules being satisfied. For example, the updated transcription may be a transcription of the user utterance that is determined by a second ASR engine. For example, the updated transcription may be based on the acoustic model. Continuing with the above example, where the transcription determined by the ASR engine is the word "Pause," the first override triggering rule of the acoustic model, once determined to be satisfied (e.g., the level of confidence for the "o" sound outweighs the level of confidence for the "au" sound by at least 20% or more), may indicate that the updated transcription should be "Pose." The computing device may be a server (e.g., resident in the cloud), in which case the computing device may send the updated transcription to a user device associated with the user utterance. In this way, the user device would receive the updated transcription rather than the transcription determined by the ASR engine. For example, the computing device may be the user device, in which case the computing device would output/display the updated transcription rather than the transcription determined by the ASR engine.

Figure 10:
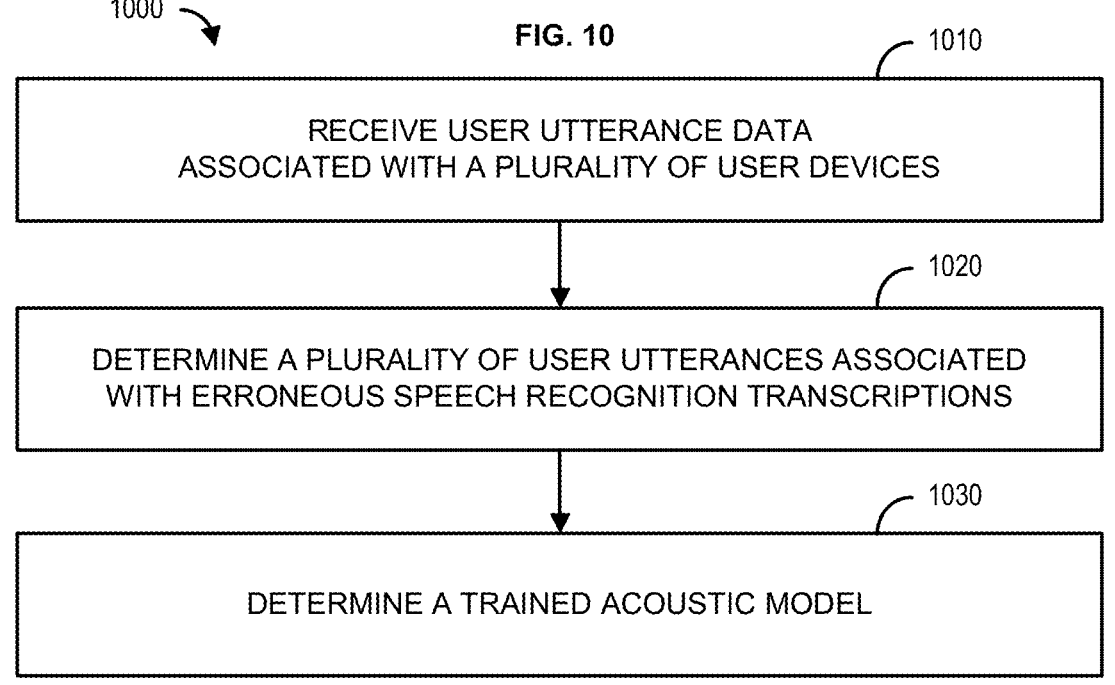
FIG. 10 shows a flowchart for an example method.

FIG. 10 shows a flowchart of an example method 1000 for improving speech recognition and transcription. The method 1000 may be performed in whole or in part by a single computing device, a plurality of computing devices, and the like. For example, the computing device 102, the training module 320, the server 802, the computing device 801, and/or the computing device 803 may be configured to perform the method 1000.

At step 1010, a computing device may receive user utterance data associated with a plurality of user devices. The user utterance data may comprise historical data related to user utterances and corresponding transcriptions previously processed by a speech recognition computing device. The speech recognition computing device may comprise an automatic speech recognition (ASR) engine. The ASR engine may have determined the corresponding transcriptions. For example, the historical data may be associated with a plurality of user device query histories and/or commands. At step 1020, the computing device may determine a plurality of user utterances that are associated with erroneous speech recognition transcriptions (e.g., erroneous ASR engine transcriptions). For example, the computing device may analyze the user utterance data and determine the plurality of user utterances that are associated with erroneous speech recognition transcriptions. The erroneous speech recognition transcriptions may be indicative of words and/or phrases that were incorrectly transcribed by the ASR engine.

At step 1030, the computing device may determine/ generate an acoustic model. For example, the computing device may use the plurality of user utterances and the erroneous ASR engine transcriptions to determine/generate the acoustic model. The computing device may comprise, or otherwise be in communication with, a machine learning ("ML") module. The ML module may extract one or more acoustic features from each user utterance associated with each of the plurality of user utterances. When extracting the one or more acoustic features, the ML module may use one or more ML techniques. The erroneous ASR engine transcriptions and the extracted one or more acoustic features may be used by the ML module determine/generate a plurality of override triggering rules. The ML module may in turn use the plurality of override triggering rules to train the acoustic model using one or more ML techniques. The acoustic model may be resident at the computing device, on a server in communication with the computing device, or separated. For example, the ASR engine may be stored at, and execute on, the server, while the acoustic model may be stored at, and execute on, the computing device—or vice versa.

The computing device may receive a new transcription associated with a new user utterance from the ASR engine. The new user utterance may be a word or phrase, such as a command or a query. The ASR engine may be resident at the computing device, or it may be resident at a server in communication with the computing device. The ASR engine may process the new user utterance to determine a transcription. For example, the new user utterance may relate to controlling a computing device that outputs audio and/or video content, and the new user utterance may comprise a name of a content item or a command related to a content item. For example, the new user utterance may relate to a query. The new user utterance may be processed by the ASR engine as well as the acoustic model. The computing device may receive an indication of one or more acoustic features from the acoustic model.

The computing device may determine that one or more of the override triggering rules are satisfied. The computing device may determine that the one or more override triggering rules are satisfied based on the one or more acoustic features. For example, the indication of the one or more acoustic features may comprise a level of confidence that each of the one or more acoustic features are present in the new user utterance. The computing device, using the acoustic model, may determine whether the one or more acoustic features satisfy one or more of the plurality of override triggering rules. An override triggering rule may be satisfied when the level of confidence for at least one acoustic feature meets or exceeds at least one confidence threshold. The computing device may determine an updated transcription to a user device associated with the new user utterance. The computing device may determine the updated transcription based on the one or more override triggering rules being satisfied. For example, the updated transcription may be a transcription of the new user utterance that is determined by a second ASR engine. For example, the updated transcription may be based on the acoustic model.

The computing device may be a server (e.g., resident in the cloud), in which case the computing device may send the updated transcription to a user device associated with the user utterance. In this way, the user device would receive the updated transcription rather than the transcription determined by the ASR engine. For example, the computing device may be the user device, in which case the computing device would output/display the updated transcription rather than the transcription determined by the ASR engine.

Figure 11:
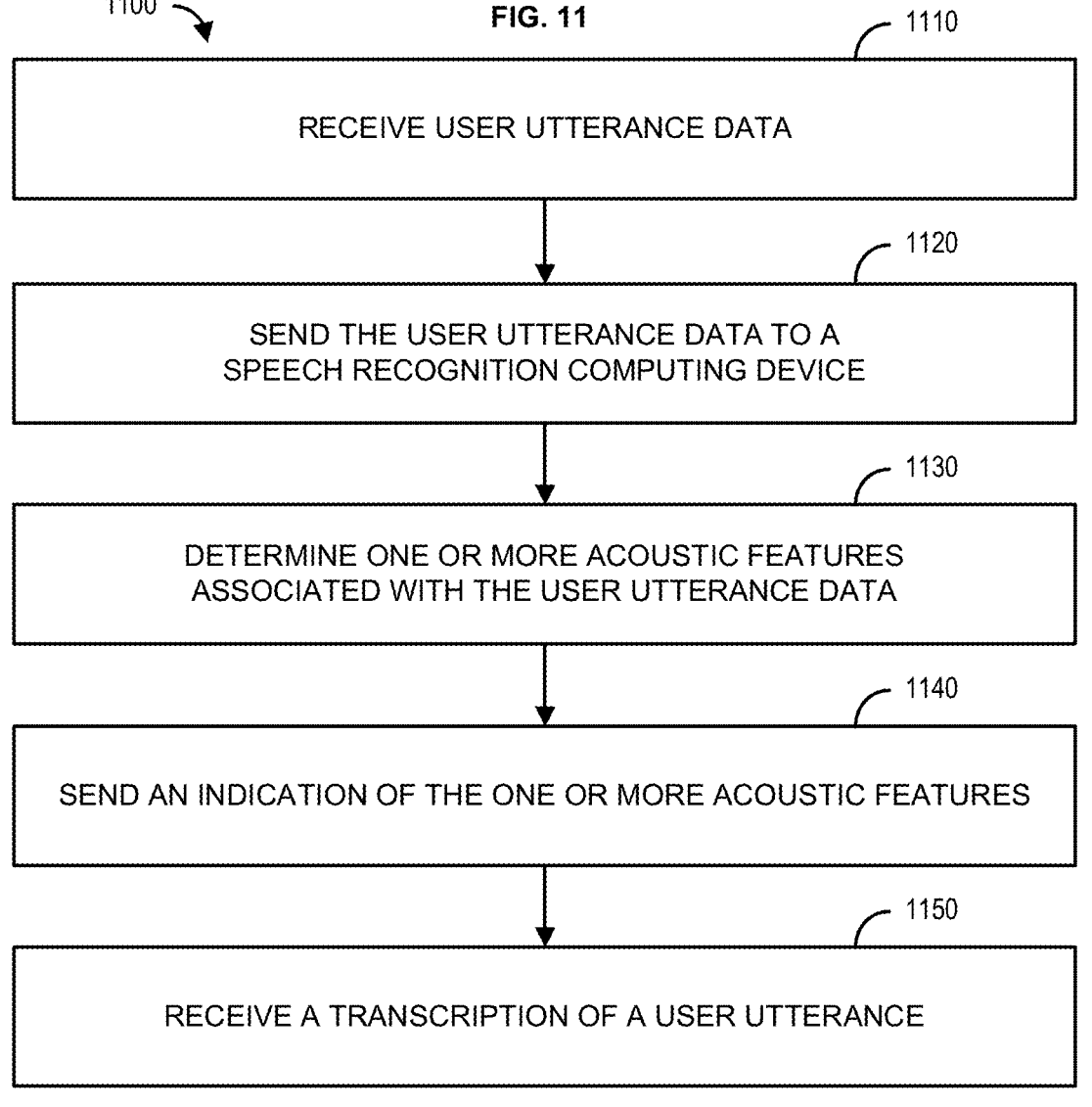
FIG. 11 shows a flowchart for an example method.

FIG. 11 shows a flowchart of an example method 1100 for improving speech recognition and transcription. The method 1100 may be performed in whole or in part by a single computing device, a plurality of computing devices, and the like. For example, the computing device 102, the training module 320, the server 802, the computing device 801, and/or the computing device 803 may be configured to perform the method 1100.

At step 1110, a computing device may receive user utterance data associated with a user utterance. The computing device may be a user device or a smart device. The user utterance may be a word or phrase, such as a command or a query. For example, the user utterance may relate to controlling the computing device, and the user utterance may comprise a name of a content item or a command related to a content item. For example, the user utterance may relate to a query. At step 1120, the computing device may send the user utterance data to a speech recognition computing device. The speech recognition computing device may comprise an automatic speech recognition (ASR) engine. The ASR engine may be resident at a second computing device, such as a server in the cloud. device. The second computing device may receive and process the user utterance data using the ASR engine to determine a transcription.

At step 1130, the computing device may determine one or more acoustic features associated with the user utterance data. For example, the one or more acoustic features may be associated with the user utterance. The computing device may determine the one or more acoustic features using an acoustic model resident at the computing device. The acoustic model may be trained using historical user utterance data. For example, the speech recognition computing device, or another computing device, may determine/generate and train the acoustic model. The user utterance data may comprise historical data related to user utterances previously processed by an ASR engine and corresponding transcriptions determined by the ASR engine. For example, the historical data may be associated with a plurality of user device query histories and/or commands. The historical data and associated user utterance data may be analyzed to determine a plurality of user utterances that are associated with erroneous ASR engine transcriptions. For example, the erroneous ASR engine transcriptions may be indicative of words and/or phrases that were incorrectly transcribed by the ASR engine.

The computing device that determines/generates and trains the acoustic model may comprise, or otherwise be in communication with, a machine learning ("ML") module. The ML module may extract one or more acoustic features from each user utterance associated with each of the plurality of user utterances. When extracting the one or more acoustic features, the ML module may use one or more ML techniques. The erroneous ASR engine transcriptions and the extracted one or more acoustic features may be used by the ML module determine/generate a plurality of override triggering rules. The ML module may in turn use the plurality of override triggering rules to train the acoustic model using one or more ML techniques.

At step 1140, the computing device may send an indication of the one or more acoustic features associated with the user utterance data to the speech recognition computing device. The speech recognition computing device may determine that one or more of the override triggering rules are satisfied. The speech recognition computing device may determine that the one or more override triggering rules are satisfied based on the indication of the one or more acoustic features. For example, the indication of the one or more acoustic features may comprise a level of confidence that each of the one or more acoustic features are present in the user utterance. The speech recognition computing device may determine whether the one or more acoustic features satisfy one or more of the plurality of override triggering rules. An override triggering rule may be satisfied when the level of confidence for at least one acoustic feature meets or exceeds at least one confidence threshold. For example, the transcription determined by the ASR engine may be the word "Pause," and a first override triggering rule may be associated with transcriptions of the word "Pause." The first override triggering rule may be satisfied when the at least one acoustic feature is the "o" sound and the corresponding level of confidence is 20% that the "o" sound is present is stronger than a level of confidence for another acoustic feature corresponding to the "au" sound. That is, the first override triggering rule may be satisfied when the level of confidence indicating that the acoustic feature of the "o" sound is present outweighs the level of confidence indicating that the acoustic feature of the "au" sound is present by at least 20% or more.

At step 1150, the computing device may receive a transcription of the user utterance. The transcription received by the computing device may be the original transcription determined by the ASR engine, or it may be an updated transcription. The updated transcription may be a transcription of the user utterance that is determined by a second ASR engine. For example, the updated transcription may be based on the indication of the one or more acoustic features. Continuing with the above example, where the transcription determined by the ASR engine is the word "Pause," the first override triggering rule of the acoustic model, once determined to be satisfied (e.g., the level of confidence for the "o" sound outweighs the level of confidence for the "au" sound by at least 20% or more), may indicate that the updated transcription should be "Pose." Therefore, the transcription received by the computing device may be an updated transcription rather than the original transcription determined by the ASR engine.

Figure 12:
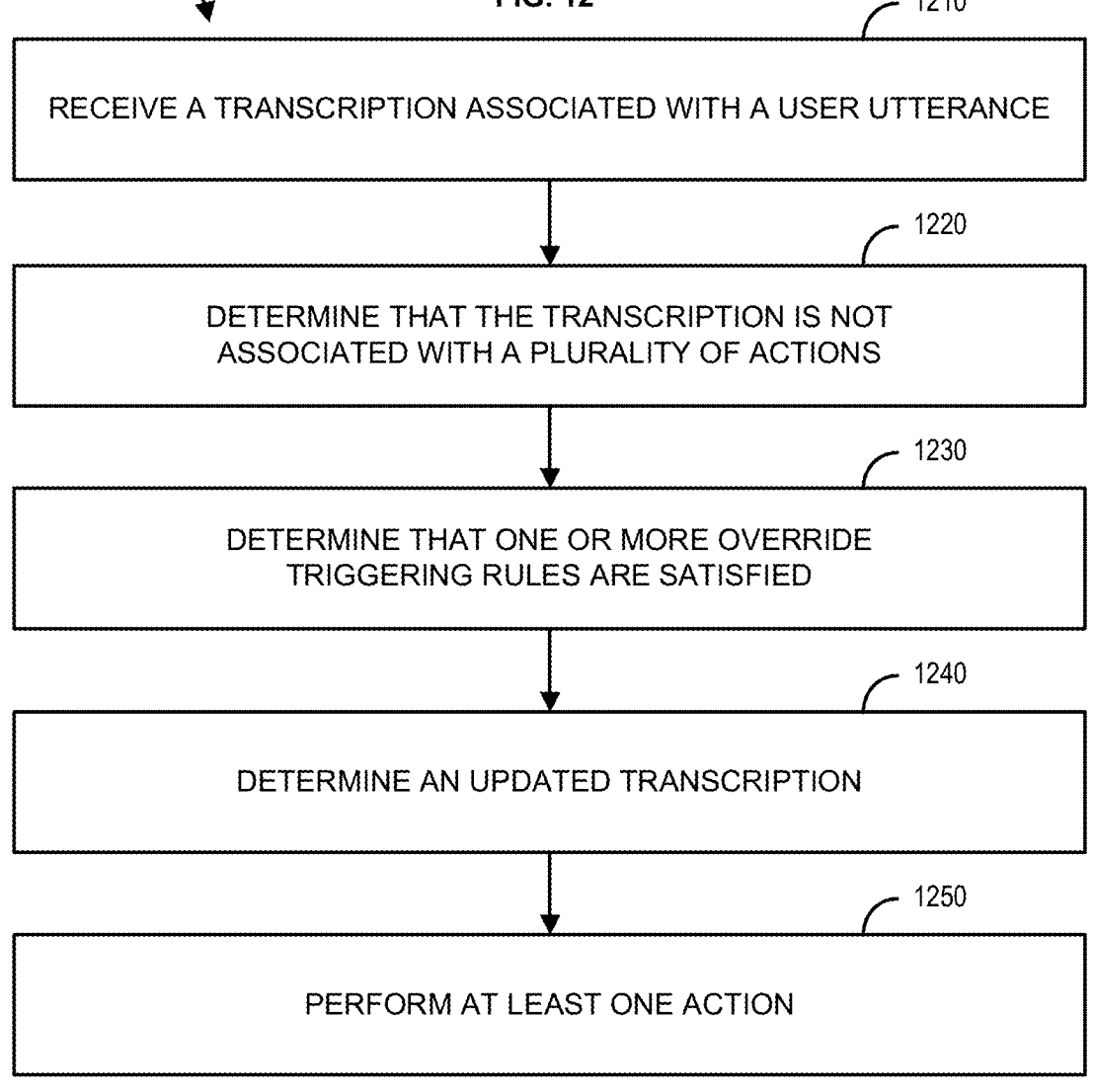
FIG. 12 shows a flowchart for an example method.

FIG. 12 shows a flowchart of an example method 1200 for improving speech recognition and transcription. The method 1200 may be performed in whole or in part by a single computing device, a plurality of computing devices, and the like. For example, the computing device 102, the training module 320, the server 802, the computing device 801, and/or the computing device 803 may be configured to perform the method 1200.

At step 1210, a computing device may receive a transcription associated with a user utterance. The computing device may be a user device or a smart device. The user utterance may be a word or phrase, such as a command or a query. For example, the user utterance may relate to controlling the computing device, and the user utterance may comprise a name of a content item or a command related to a content item. For example, the user utterance may relate to a query. The computing device may receive the transcription from a speech recognition computing device. The speech recognition computing device may comprise an automatic speech recognition (ASR) engine. The user utterance may be associated with at least one action of a plurality of actions. The plurality of actions may comprise a plurality of commands that may relate to controlling the computing device or another computing device and/or user device. For example, the user utterance may be "Play next song," and "Play" may be a command of the plurality of commands.

At step 1220, the computing device may determine that the transcription is not associated with the plurality of actions. For example, the transcription may comprise "Lay next song." The word "lay" may not correspond to any of the plurality of actions or the plurality of commands. At step 1230, the computing device may determine whether one or more override triggering rules associated with the transcription are satisfied. For example, the computing device may determine whether the one or more override triggering rules are satisfied based on the transcription not corresponding to any of the plurality of actions or the plurality of commands. The computing device may determine whether the one or more override triggering rules are satisfied based on an acoustic model and one or more acoustic features associated with the user utterance. The one or more acoustic features may indicate that the "p-uh" sound is present in the user utterance. The one or more override triggering rules may be satisfied based on the one or more acoustic features indicating that the "p-uh" sound is present in the user utterance.

Each of the one or more acoustic features may be associated with a level of confidence that each of the one or more acoustic features is present in the user utterance. The one or more override triggering rules may be satisfied when the corresponding level of confidence for at least one acoustic feature meets or exceeds at least one confidence threshold. For example, the transcription may comprise "Lay next song." The one or more override triggering rules may be associated with transcriptions of the word "Play." The one or more override triggering rules may be satisfied when a corresponding level of confidence that at least one acoustic feature indicates that the "p-uh" sound is present in the user utterance is 60% or greater. Other percentages for the level of confidence may be used.

At step 1240, an updated transcription may be determined. The updated transcription may be determined by the computing device. The updated transcription may be determined based on the one or more override triggering rules being satisfied. The updated transcription may be associated with the at least one action of the plurality of actions. For example, the updated transcription may comprise at least one command of the plurality of commands. For example, the updated transcription may comprise the word "Play." At step 1250, the at least one action may be performed. For example, the at least one command may be executed by the computing device, a user device, etc. Performing the at least one command may comprise playing a song, based on the updated transcription comprising the word "Play" and the user utterance comprising "next song."

While specific configurations have been described, it is not intended that the scope be limited to the particular configurations set forth, as the configurations herein are intended in all respects to be possible configurations rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. A method comprising:
   determining, by a computing device, based on one or more acoustic features associated with a user utterance, that one or more override triggering rules associated with a transcription of the user utterance are satisfied; and
   causing, based on an updated transcription of the user utterance, at least one action to be performed, wherein the updated transcription is generated based on the one or more override triggering rules being satisfied.

2. The method of claim 1, wherein determining that the one or more override triggering rules are satisfied comprises:
   determining, based on the one or more acoustic features, that a level of confidence associated with the one or more acoustic features meets or exceeds a confidence threshold associated with the one or more override triggering rules.

3. The method of claim 1, wherein causing the at least one action to be performed comprises at least one of:
   causing the updated transcription to be output by a user device;
   causing the updated transcription to be sent to the user device;
   causing the computing device to perform at least one command indicated by the updated transcription; or
   causing the user device to perform the at least one command indicated by the updated transcription.

4. The method of claim 1, further comprising at least one of:
   receiving, from a speech recognition computing device, the transcription of the user utterance;
   based on the one or more override triggering rules being satisfied, generating, by the speech recognition computing device, the updated transcription of the user utterance; or
   receiving, from the speech recognition computing device, the updated transcription of the user utterance.

5. The method of claim 1, further comprising at least one of:
   receiving an indication of the one or more acoustic features associated with the user utterance; or
   determining, based on an acoustic model, the one or more acoustic features associated with the user utterance.

6. The method of claim 1, further comprising:
   determining, based on historical user utterance data, a plurality of user utterances comprising the one or more acoustic features; and
   determining, based on the plurality of user utterances, an acoustic model, wherein the acoustic model is configured to override erroneous transcriptions of user utterances comprising the one or more acoustic features.

7. The method of claim 6, further comprising:
   determining, based on the historical user utterance data, the one or more override triggering rules, wherein the acoustic model is configured to override erroneous transcriptions of user utterances based on the one or more override triggering rules.

8. One or more non-transitory computer-readable media storing processor-executable instructions that, when executed by one or more processors, cause the one or more processors to:
   determine, based on one or more acoustic features associated with a user utterance, that one or more override triggering rules associated with a transcription of the user utterance are satisfied; and
   cause, based on an updated transcription of the user utterance, at least one action to be performed, wherein the updated transcription is generated based on the one or more override triggering rules being satisfied.

9. The one or more non-transitory computer-readable media of claim 8, wherein the processor-executable instructions that cause the one or more processors to determine that the one or more override triggering rules are satisfied further cause the one or more processors to:
   determine, based on the one or more acoustic features, that a level of confidence associated with the one or more acoustic features meets or exceeds a confidence threshold associated with the one or more override triggering rules.

10. The one or more non-transitory computer-readable media of claim 8, wherein the processor-executable instructions that cause the one or more processors to cause the at least one action to be performed further cause the one or more processors to one or more of:
    cause the updated transcription to be output by a user device;
    cause the updated transcription to be sent to the user device;
    perform at least one command indicated by the updated transcription; or
    cause the user device to perform the at least one command indicated by the updated transcription.

11. The one or more non-transitory computer-readable media of claim 8, wherein the processor-executable instructions further cause the one or more processors to one or more of:
    receive, from a speech recognition computing device, the transcription of the user utterance;
    based on the one or more override triggering rules being satisfied, cause the speech recognition computing device to generate the updated transcription of the user utterance; or
    receive, from the speech recognition computing device, the updated transcription of the user utterance.

12. The one or more non-transitory computer-readable media of claim 8, wherein the processor-executable instructions further cause the one or more processors to one or more of:
    receive an indication of the one or more acoustic features associated with the user utterance; or
    determine, based on an acoustic model, the one or more acoustic features associated with the user utterance.

13. The one or more non-transitory computer-readable media of claim 8, wherein the processor-executable instructions further cause the one or more processors to:
    determine, based on historical user utterance data, a plurality of user utterances comprising the one or more acoustic features; and
    determine, based on the plurality of user utterances, an acoustic model, wherein the acoustic model is configured to override erroneous transcriptions of user utterances comprising the one or more acoustic features.

14. The one or more non-transitory computer-readable media of claim 13, wherein the processor-executable instructions further cause the one or more processors to:

determine, based on the historical user utterance data, the one or more override triggering rules, wherein the acoustic model is configured to override erroneous transcriptions of user utterances based on the one or more override triggering rules.

15. An apparatus comprising:

at least one processor; and memory storing processor-executable instructions that, when executed by the at least one processor, cause the apparatus to:

determine, based on one or more acoustic features associated with a user utterance, that one or more override triggering rules associated with a transcription of the user utterance are satisfied; and cause, based on an updated transcription of the user utterance, at least one action to be performed, wherein the updated transcription is generated based on the one or more override triggering rules being satisfied.

16. The apparatus of claim 15, wherein the processor-executable instructions that cause the apparatus to determine that the one or more override triggering rules are satisfied further cause the apparatus to:

determine, based on the one or more acoustic features, that a level of confidence associated with the one or more acoustic features meets or exceeds a confidence threshold associated with the one or more override triggering rules.

17. The apparatus of claim 15, wherein the processor-executable instructions that cause the apparatus to cause the at least one action to be performed further cause the apparatus to one or more of:

cause the updated transcription to be output by a user device;

cause the updated transcription to be sent to the user device;

perform at least one command indicated by the updated transcription; or cause the user device to perform the at least one command indicated by the updated transcription.

18. The apparatus of claim 15, wherein the processor-executable instructions further cause the apparatus to one or more of:

receive, from a speech recognition computing device, the transcription of the user utterance based on the one or more override triggering rules being satisfied, cause the speech recognition computing device to generate the updated transcription of the user utterance; or receive, from the speech recognition computing device, the updated transcription of the user utterance.

19. The apparatus of claim 15, wherein the processor-executable instructions further cause the apparatus to one or more of:

receive an indication of the one or more acoustic features associated with the user utterance; or determine, based on an acoustic model, the one or more acoustic features associated with the user utterance.

20. The apparatus of claim 15, wherein the processor-executable instructions further cause the apparatus to:

determine, based on historical user utterance data, a plurality of user utterances comprising the one or more acoustic features; and determine, based on the plurality of user utterances, an acoustic model, wherein the acoustic model is configured to override erroneous transcriptions of user utterances comprising the one or more acoustic features.

* * * * *